Feb. 5, 1924.

C. G. OVERMYER 1,482,660

GLASS CASTER

Filed May 23, 1921
2 Sheets-Sheet 1

Inventor

C. G. Overmyer.

By CA Snow & Co.

Attorney

Feb. 5, 1924.
C. G. OVERMYER
GLASS CASTER
Filed May 23, 1921
1,482,660
2 Sheets-Sheet 2
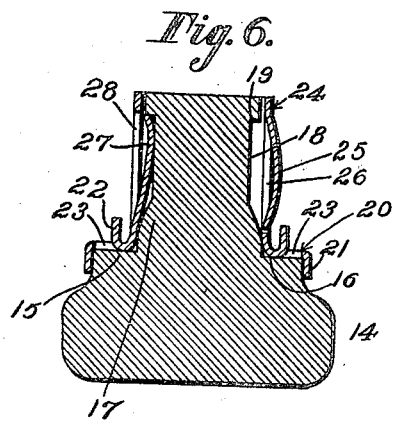
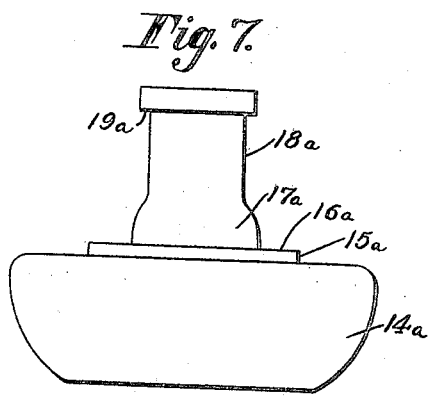
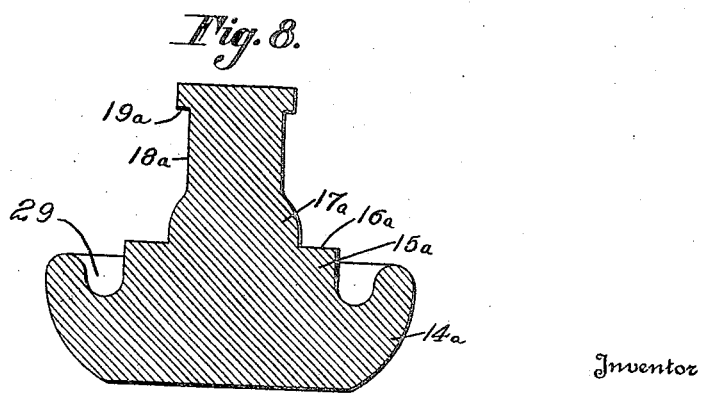

Patented Feb. 5, 1924.

1,482,660

UNITED STATES PATENT OFFICE.

CHARLES G. OVERMYER, OF HARTFORD CITY, INDIANA.

GLASS CASTER.

Application filed May 23, 1921. Serial No. 471,703.

*To all whom it may concern:*

Be it known that I, CHARLES G. OVER-MYER, a citizen of the United States, residing at Hartford City, in the county of Blackford and State of Indiana, have invented a new and useful Glass Caster, of which the following is a specification.

The device forming the subject matter of this application is a caster, and one object of the invention is to provide a caster which, being made preferably of glass will be ornamental, non-rusting and sanitary, the caster being strong and capable of free movement over polished floors, without marring the floors.

Another object of the invention is to provide novel means for retaining the caster in the leg of an article of furniture.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings:—

Figure 1:
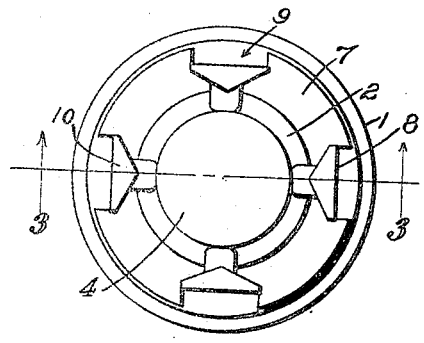
Figure 4:
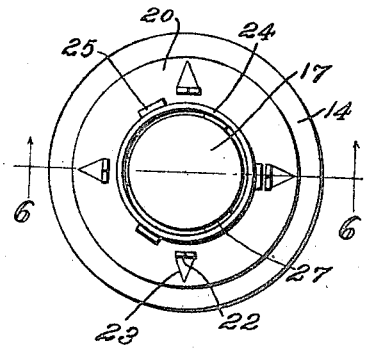
Figure 2:
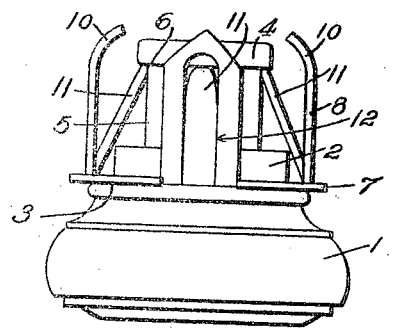
Figure 5:
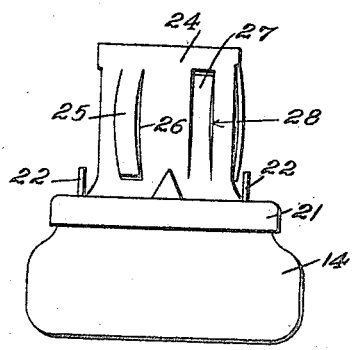
Figure 3:
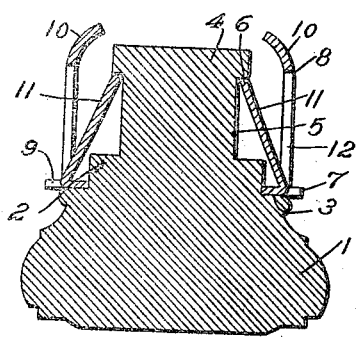

Figure 1 shows in top plan, a device constructed in accordance with the invention; Figure 2 is a side elevation; Figure 3 is a vertical longitudinal section; Figure 4 is a plan showing a modified form of the invention; Figure 5 is an elevation of the structure shown in Figure 4; Figure 6 is a cross section on the line 6—6 of Figure 4; Figure 7 is an elevation showing a modified form of caster; and Figure 8 is a longitudinal section showing the caster delineated in Figure 7.

Referring to Figures 1, 2 and 3, there is provided a caster which, preferably, is made of glass, the caster including a body 1 having a reduced neck 2 defining a shoulder 3. A reduced stem 4 projects upwardly from the neck 2 and has a circumscribing groove 5 defining an upper annular shoulder 6.

A retainer is provided, the same preferably being made of metal, and including an annular base 7 surrounding the neck 2 and supported on the shoulder 3. Upstanding resilient arms 8 are struck from the base 1 as indicated at 9, the arms having inwardly extended guiding ends 10, which serve to direct the arms into the cavity in the lower end of the leg of an article of furniture, the arms serving to hold the device upon the leg. Resilient inwardly inclined fingers 11 are struck as indicated at 12 from the arms 8, the upper ends of the fingers engaging the shoulder 6, to hold the retainer on the caster.

Passing to the form shown in Figures 4, 5 and 6, the caster includes a body 14 having a reduced neck 15 defining a shoulder 16. A reduced stem 17 projects from the neck 15 and is supplied with a circumscribing groove 18 forming an upper shoulder 19.

A retainer is supplied, the same including an annular base 20 surrounding the neck 15 and supported on the shoulder 16, the base portion of the retainer having a depending marginal flange 21 surrounding the neck 15. If the device is to be used on an article of furniture which has wooden legs, it may be desirable to form upstanding pointed prongs 22 on the base 20, the prongs preferably being struck from the base as indicated at 23. The base 20 has an upstanding tubular extension 24 surrounding the stem 17. Depending arms 25 are struck from the tubular extension 24 and are bowed outwardly, the upper ends of the arms being formed integrally with the part 24, and the lower ends of the arms being received slidably in the slots 26 which are formed when the arms 25 are struck from the part 24. The arms 25 are adapted to be received in the cavity in the lower end of an article of furniture, and serve to hold the device on the leg. Upstanding fingers 27 are struck from the extension 24, as indicated at 28, the fingers 27 being inwardly inclined, as shown in Figure 6, and cooperating with the shoulder 19 to hold the retainer on the caster.

If desired the caster may be formed as shown in Figures 7 and 8, parts hereinbefore described being designated by numerals previously used, with the suffix "a." The body 14$^a$ of the caster is supplied in its upper surface, about the neck 15$^a$, with an annular depression 29, the body portion of the caster thus being cup-shaped. The depression 29 may be used for various purposes, for instance, to contain an insecticide. In connection with the form shown in Figures 7 and 8, it may be stated that the caster therein depicted is adapted to be used with the retainer shown in Figures 6, 5 and 4.

I claim:—

1. In a device of the class described, a caster comprising a body and a neck, a retainer including a base supported on said body and having a tubular extension receiving said neck, the extension being slotted to form arms, one arm being engaged with the neck and another being resilient to hold the retainer and the caster in an article of furniture.

2. In a device of the class described, a caster comprising a body and a neck; and a retainer including a base supported on the body, and a tubular extension receiving the neck, the neck being slotted to form upstanding and depending arms, the upstanding arms being engaged with the neck, and the depending arm being resilient to hold the retainer and the caster in an article of furniture.

In testimony that I claim the foregoing as my own, I have hereto affixed my signature in the presence of two witnesses.

CHARLES G. OVERMYER

Witnesses:
 EARL REASONER,
 LEWIS REEVES.